United States Patent [19]
Konishi et al.

[11] Patent Number: 5,265,691
[45] Date of Patent: Nov. 30, 1993

[54] RACK-AND-PINION STEERING APPARATUS

[75] Inventors: Hideo Konishi; Tadaaki Fujii, both of Saitama, Japan

[73] Assignee: Jidosha Kiki Co., Ltd., Japan

[21] Appl. No.: 932,268

[22] Filed: Aug. 19, 1992

[30] Foreign Application Priority Data

Aug. 26, 1991 [JP] Japan .................. 3-236936

[51] Int. Cl.$^5$ ........................ B62D 3/12; B62D 5/22
[52] U.S. Cl. ..................................... 180/148; 74/422; 74/498
[58] Field of Search ............... 180/147, 148, 149, 150, 180/151, 152; 74/422, 498, 29

[56] References Cited

U.S. PATENT DOCUMENTS 3,585,875  6/1971  Adams ........................ 74/422
4,195,862  4/1980  Specktor et al. ............ 280/661
4,793,433 12/1988  Emori et al. ................ 180/143
4,898,258  2/1990  Ohe et al. ................... 180/79.1

FOREIGN PATENT DOCUMENTS 281115  11/1990  Japan .
2115105  9/1983  United Kingdom .

Primary Examiner—Mitchell J. Hill
Attorney, Agent, or Firm—Blakely, Sokoloff, Taylor & Zafman

[57] ABSTRACT

A cushioning material sheet to be interposed between a rack support and a press plug for applying an elastic force provided by a spring is formed such that at least its one end face is tapered. Slide-contact surfaces of the rack support and the press plug to be brought into contact with the two end faces of the cushioning material sheet are so formed as to move the cushioning material sheet in a direction perpendicular to a rack support direction, along which the thickness of the cushioning material sheet is decreased. A biasing member is provided to bias the cushioning material sheet in this direction of movement, thereby obtaining a proper meshed condition between a pinion and a rack.

4 Claims, 3 Drawing Sheets

RACK-AND-PINION STEERING APPARATUS

BACKGROUND OF THE INVENTION

The present invention relates to a rack-and-pinion steering apparatus and, more particularly, to a rack support structure of a rack-and-pinion steering apparatus.

A rack-and-pinion steering apparatus has a steering gear constituted by a rack arranged in the lateral direction between the left and right front wheels (wheels to be steered) of an automobile and a pinion provided at one end portion of a steering wheel shaft and meshed with the rack. This rack-and-pinion steering apparatus converts a rotational displacement according to a steering wheel operation into a linear displacement in the direction of the rack axis, thereby turning the front wheels in a desired direction via a steering link mechanism. The apparatus of this type has a simpler arrangement and a better steering performance than those of apparatuses of other types, and is also advantageous in terms of an installation space.

For this reason, the rack-and-pinion steering apparatus of this type has been adopted not only in manual steering apparatuses but also in power steering apparatuses, such as hydraulic or electric power steering apparatuses. Examples are a manual steering apparatus disclosed in GB2115105A, a hydraulic power steering apparatus disclosed in U.S. Pat. No. 4,793,433, and an electric power steering apparatus disclosed in U.S. Pat. No. 4,898,258.

In the rack-and-pinion steering apparatus of this type, the rack to be meshed with the pinion is supported by a rack support structure constituted by a rack support, a spring means, and a press plug. The rack support is a support member consisting of a metal, which is arranged on the bottom surface side of the rack, i.e., the opposite side of the rack from the pinion, and has a guide groove for slidably supporting the rack in the direction of the rack axis. The spring means biases this rack support in the direction in which the rack meshes with the pinion. The press plug, which is also called an adjusting plug, is so screwed as to close the outer end portion of a hole for assembling these rack support parts into a body and applies a predetermined elastic force to the spring means.

A holding function of the rack support, such as a metal support member, which is biased by the spring means allows the rack teeth of the rack to mesh well with the pinion teeth of the pinion. As a result, a rotational displacement according to a steering wheel operation is extracted as a reciprocal motion in the axial direction to turn the front wheels (wheels to be steered).

This rack support is considered important in ensuring a smooth meshed condition between the rack and the pinion and performing a proper and reliable steering operation.

Conventional rack supports having this function are generally formed by using only metals. In recent years, however, rack supports consisting of only resin materials or both resin materials and metals have been proposed. In particular, a rack support of the latter type can stably and reliably support a rack while maintaining stiffness by its metal member. In addition, its resin member arranged on the sliding surface to be brought into contact with a rack can decrease a frictional resistance with the rack, thereby eliminating a noise problem.

The above conventional rack supports, particularly those including metal members, however, generate a metallic sound, so-called rattle noise, during driving on a bumpy road. More specifically, as described above, the rack support is elastically supported by the spring means interposed between the rack support and the press plug for closing the opening portion of the rack support parts assembly hole of the main body and serving as a fixing member. Therefore, the rack support can absorb a slight load variation, such as a set load. However, upon application of a larger load, such as a kickback, onto the rack, the metal support member cannot be prevented from abutting against the press plug, and this makes it difficult to suppress the rattle noise.

For this reason, in the above rack support, a resin sheet pad is inserted on the sliding surface of a metal support main body for supporting the rack, or a cushioning material sheet, such as a resin sheet-like packing, is interposed between the metal support main body and the press plug. As a result, an impact between the metal members is eliminated, and a backlash in the meshed portion between the pinion and the rack is adjusted by the elastic force provided by the press plug and the spring means.

Even when the resin sheet pad or the cushioning material sheet as described above is used, however, if wear or the like is caused in the meshed portion between the rack and the pinion or the sliding portion, backlash in the meshed portion between the rack and the pinion is increased to pose the problem of rattle noise.

SUMMARY OF THE INVENTION

It is, therefore, a principal object of the present invention to provide a rack-and-pinion steering apparatus capable of preventing rattle noise produced by, for example, a backlash, a manufacturing error, or wear.

In order to achieve the above object of the present invention, there is provided a rack-and-pinion steering apparatus comprising a body accommodating a rack to be meshed with a pinion, a rack support slidably accommodated in a hole formed in the body, a spring means for biasing the rack support toward the rack, a press plug assembled to close an outer end portion of the hole while applying an elastic force to the spring means, a cushioning material sheet interposed between the rack support and the press plug, the cushioning material sheet having a tapered shape when viewed sideways, and a biasing means for biasing the cushioning material sheet to move in a direction along which a thickness of the cushioning material sheet is decreased.

DESCRIPTION OF THE PREFERRED EMBODIMENTS

Figure 1:
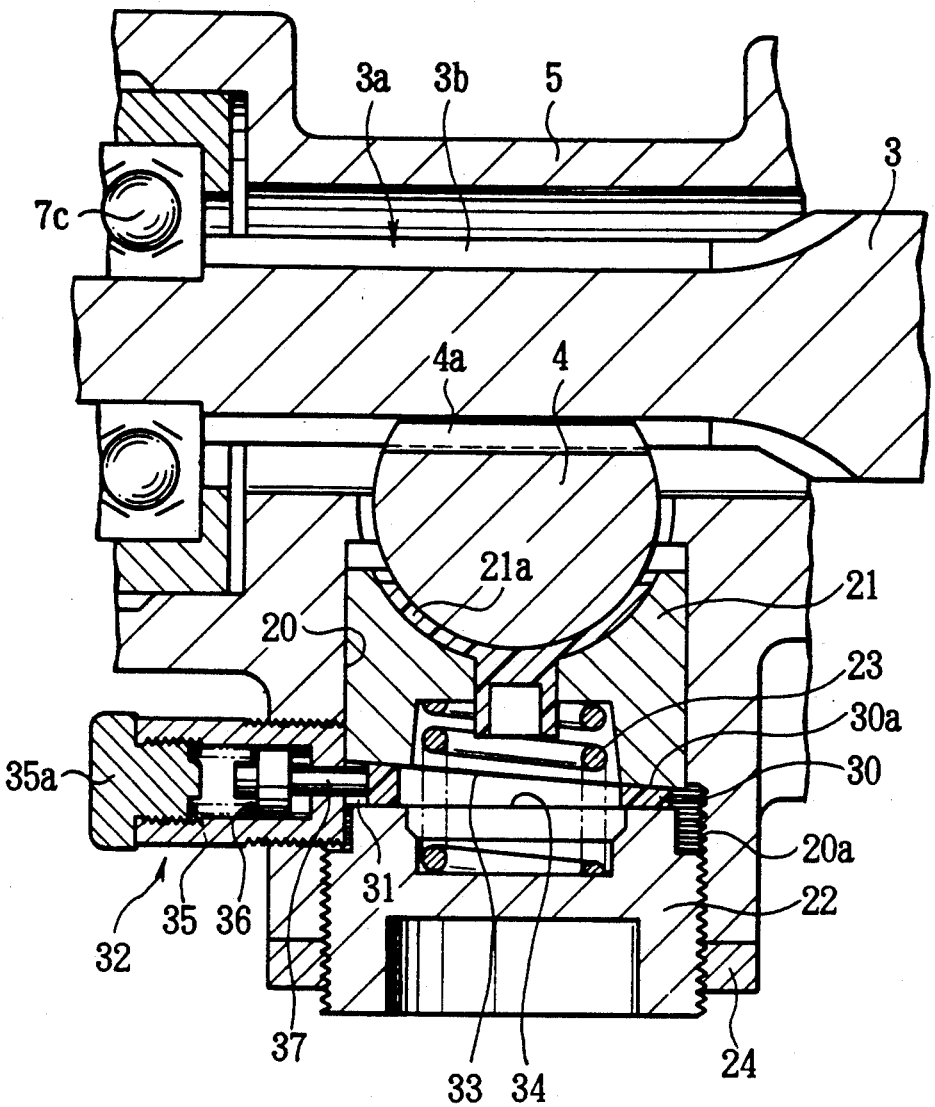
FIG. 1 is an enlarged sectional view showing a main part of an embodiment of a rack-and-pinion steering apparatus according to the present invention.
Figure 2:
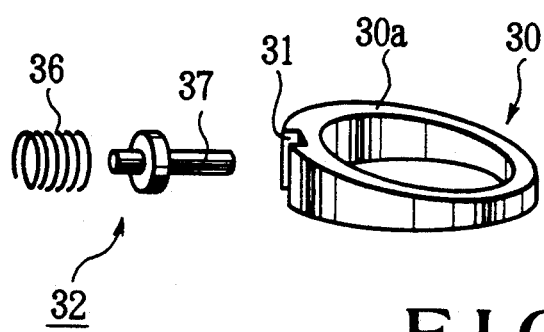
FIG. 2 is a schematic perspective view showing a cushioning material sheet and its biasing means as characteristic features of the present invention.
Figure 3:
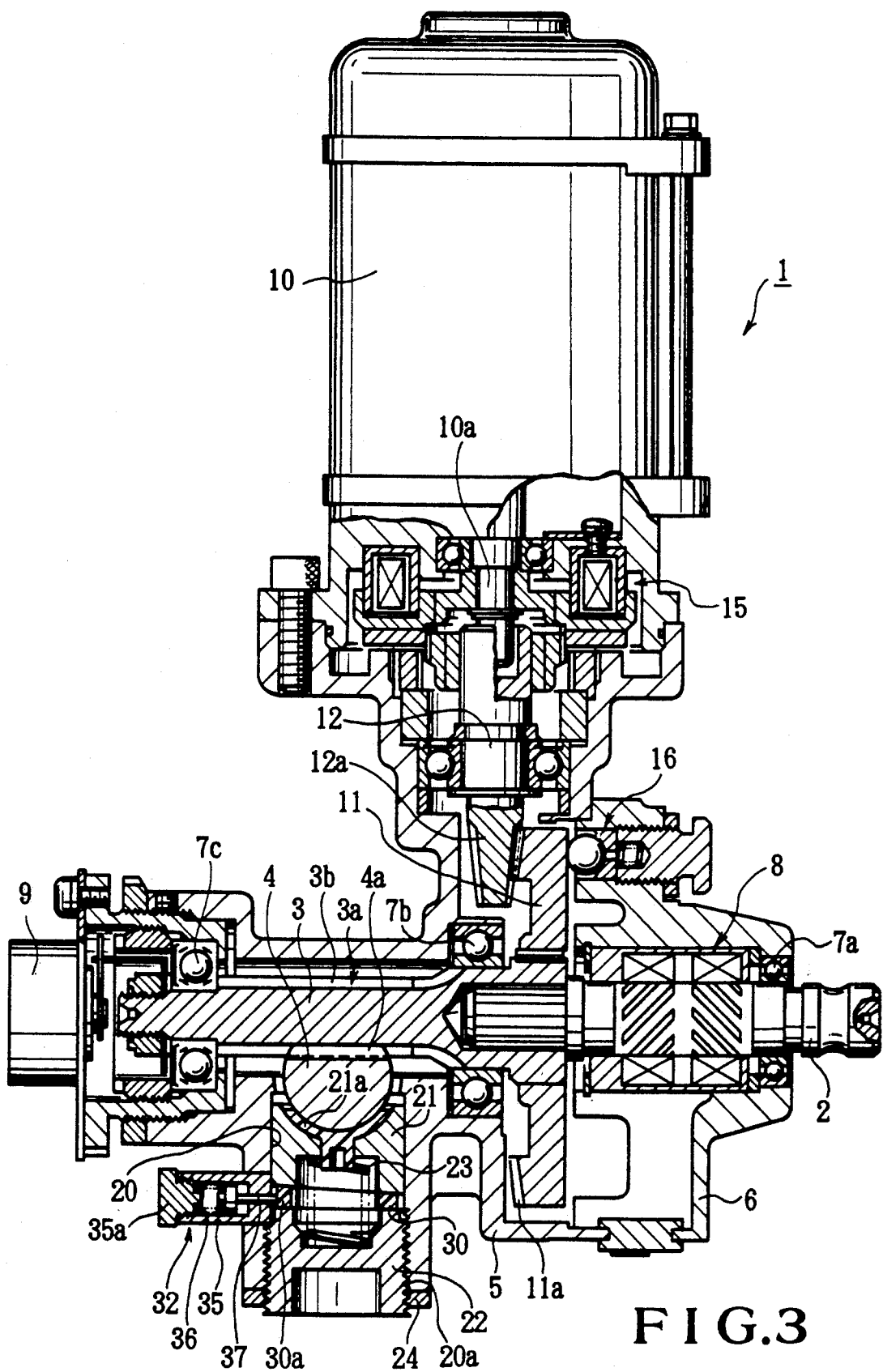
FIG. 3 is a schematic sectional view showing an arrangement of an entire electric power steering apparatus to which the present invention can be suitably applied.

FIGS. 1 to 3 show one embodiment of a rack-and-pinion steering apparatus according to the present invention, in which the present invention is applied to an electric power steering apparatus using an electric motor as an auxiliary steering force generating means.

First, a schematic arrangement of an electric power steering apparatus generally denoted by reference numeral 1 will be described below with reference to FIG. 3. Referring to FIG. 3, reference numeral 2 denotes an input shaft coupled to a steering wheel (not shown); and 3, a pinion shaft as an output shaft having a pinion 3a coupled to front wheels (wheels to be steered, not shown) via a rack 4. The two shafts 2 and 3 are aligned on the same axis by a coupling means (serration press fitting is exemplified in FIG. 3), thereby constituting a steering shaft. The shafts 2 and 3 thus constituting the steering shaft and the rack 4 having rack teeth 4a to be meshed with the pinion 3a extend through steering gear bodies 5 and 6 and are rotated according to a steering operation.

Note that reference numerals 7a, 7b, and 7c denote ball bearings for supporting the shafts 2 and 3 such that the two shafts freely rotate in the bodies 5 and 6. The rack 4, together with a tie rod or the like (not shown), constitutes a steering link mechanism for coupling the front wheels.

Reference numeral 8 denotes a torque sensor for sensing a torque of the input shaft 2 in the steering gear body 6, thereby sensing a steering request transmitted from the steering wheel. In this embodiment, a magnetostrictive torque sensor as disclosed in Japanese Patent Laid-Open No. 2-281115 is exemplified. That is, in Japanese Patent Laid-Open No. 2-281115, a strain sensing layer consisting of a high-permeability soft magnetic material is formed on the input shaft 2, and a sensor coil for sensing a permeability change caused by a strain of the strain sensing layer is arranged on the body side so as to surround the strain sensing layer. An output obtained by this sensor coil is supplied to an electric control system of an electric motor as an auxiliary steering force generating source. As such a torque sensor, however, it is possible to use a structure in which the two shafts are coupled by a torsion bar so as to pivot through a predetermined angle and a relative angular displacement between them is sensed by a non-contact type sensor.

Reference numeral 9 denotes a steering monitor sensor arranged to oppose one end portion of the pinion shaft 3. The steering monitor sensor 9 acquires steering angle data and steering angular speed data from a rotational displacement at the end portion of the pinion shaft 3 for applying an auxiliary steering force to the front wheels in accordance with a steering operation.

In the steering shaft mechanism, a large gear 11 having a teeth surface (gear portion) 11a on its one side surface is axially fitted on a portion of the pinion shaft 3 located on the front wheel side and coupled integrally with the input shaft 2. An electric motor 10 for applying an auxiliary steering force to the pinion shaft 3 via this large gear 11 and a gear shaft 12 for receiving transmission of rotation from a motor shaft 10a are coaxially arranged perpendicularly to the pinion shaft 3. A small gear (pinion) 12a is provided at the distal end portion of the gear shaft 12. The pinion 12a serves as a transmission gear for constituting, together with the large gear 11, a reduction gear mechanism serving as a gear mechanism 13 for transmitting the auxiliary steering force. The pinion 12a is arranged to mesh sideways with a portion of the gear surface 11a of the large gear 11, thereby transmitting the auxiliary steering force from the motor 10 to the pinion shaft 3.

Note that in FIG. 3, reference numeral 15 denotes an electromagnetic clutch for selectively transmitting the power of the electric motor 10 to the pinion shaft 3. The details of the electromagnetic clutch are well known to those skilled in the art and a detailed description thereof will be omitted.

In addition, reference numeral 16 in FIG. 3 denotes a biasing means for providing elastic support. This biasing means 16 is arranged in the rotational power transmission gear mechanism 13 constituted by a gear pair with nonparallel, nonintersecting axes, such as a hypoid gear pair, at a position on the opposite side of the large gear 11 from the pinion 12a and corresponding to a portion of the large gear 11 to be meshed with the gear portion of the pinion 12a. The biasing means 16 locally and axially urges the portion of the large gear 11 so that the portion is constantly meshed with the pinion 12a, thereby ensuring a proper meshed condition between the large gear 11 and the pinion 12a.

Reference numeral 20 denotes a rack support parts assembly hole formed to extend outward from the body 5 in order to assemble rack support parts for supporting the rear surface of the rack 4 to be meshed with the pinion 3a of the pinion shaft 3. In a space at the inner end portion of this hole 20, the rack 4 having the rack teeth 4a meshed with the pinion 3a is arranged substantially perpendicularly to the pinion shaft 3 in a direction perpendicular to the drawing surface. This rack 4 is supported to be slidable along its axial direction by a metal support 21 consisting of a sintered alloy material or the like. The metal support 21 having a thin resin sheet pad 21a in its guide groove is externally fitted in the hole 20 and serves as a rack support.

A coil spring 23 as a set spring is urged upward on the drawing surface by a press plug 22 as an adjusting plug which is threadably engaged with a threaded portion 20a at the outer end portion of the hole 20. The rack 4 is biased by this coil spring 23 in a direction in which it is meshed with the pinion 3a. Note that reference numeral 24 denotes a lock nut for fixing the press plug 22 to the body 5.

The resin sheet pad 21a is molded using a material (e.g., a synthetic resin material such as oleopolyacetal) having self-lubricating properties. The resin sheet pad 21a allows the rack 4 to slide smoothly in the axial direction and elastically supports it against various forces of displacement, thereby improving a steering efficiency. The metal support 21 serving as a rack support is a molded product manufactured by a non-grind manufacturing method, such as sintering, using a sintered alloy material or the like.

According to this embodiment, the rack 4 to be meshed with the pinion 3a is a member having a substantially semicircular section, in which the lower surface opposite to the surface having the rack teeth 4a to be meshed with pinion teeth 3b is arcuated. In addition, the metal support 21 is a substantially columnar member having the resin sheet pad 21a on its surface for supporting the rack 4. However, the present invention is not limited to this embodiment, but it is possible to use a conventionally known Y-shaped rack and a combination of the resin sheet pad 21a and the metal support 21 having shapes capable of supporting this Y-shaped rack.

According to the present invention, the rack support structure of the rack-and-pinion steering apparatus (the electric power steering apparatus 1 in this embodiment) described above is characterized in that a cushioning material sheet 30 having a shape as shown in FIGS. 1 and 2 is interposed between the metal support 21 for slidably supporting, via the resin sheet pad 21a, the rack 4 to be meshed with the pinion 3a and the press plug 22 for closing the outer end portion of the rack support parts assembly hole 20 so as to apply a predetermined elastic force to the coil spring 23 as a spring means for biasing the metal support 21 toward the rack 4. This cushioning material sheet 30 is formed using a synthetic resin material or the like to have a substantially trapezoidal sectional shape in that at least one end face (in this embodiment, the upper end face on the rack support 21 side) is tapered when viewed sideways. In addition, slide-contact surfaces of the metal support 21 and the press plug 22 to be brought into contact with the two end faces of the cushioning material sheet 30 are so formed as to move the cushioning material sheet 30 in a direction (left-to-right direction in the drawing) perpendicular to the rack support direction, along which the thickness of the cushioning material sheet 30 is decreased. A biasing means 32 for biasing the cushioning material sheet 30 in this direction of movement is arranged in a direction perpendicular to the direction of assembling the rack support parts.

A tapered surface 30a on the upper end portion of the cushioning material sheet 30 is formed to have an angle of inclination of about 10° or less. This angle must be so small that the cushioning material sheet 30 does not move in the left-to-right direction against a reverse input from the metal support 21.

A slide-contact surface 33 of the metal support 21 is formed as a tapered surface having the same inclination angle as that of the upper tapered surface 30a of the cushioning material sheet 30 so that it is brought into slide contact with the tapered surface 30a.

The lower surface of the cushioning material sheet 30 is formed flat along the direction perpendicular to the rack support direction, and a slide-contact surface 34 of the press plug 22 is also formed to be flat accordingly.

The biasing means 32 has an urging member 37 for urging the cushioning material sheet 30 by means of a coil spring 36 in a cylindrical member 35 fixed in a portion of the body 5 on the side of the rack support by screwing (or welding) as a fixing means. This urging member 37 urges the cushioning material sheet 30 to move in a direction along which the thickness of the cushioning material sheet 30 is decreased. As a result, the cushioning material sheet 30 is interposed between the rack support 21 and the press plug 22 without any gap between it and the rack support 21 or the press plug 22. This makes it possible to constantly apply a pre-load capable of meshing the rack 4 with the pinion 3a in a predetermined condition by the biasing force of the coil spring 23.

The biasing force of the coil spring 36 biases the cushioning material sheet 30 to the right in the drawing. This biasing force is set to be smaller than that of the coil spring 23 for producing an elastic force for biasing the metal support 21 toward the rack 4. Note that reference numeral 35a denotes a plug for closing the outer end portion of the cylindrical member 35.

As is apparent from FIGS. 1 and 2, the distal end portion of the urging member 37 is engaged with a rotation-stop groove 31 formed in the outer circumferential surface of the cushioning material sheet 30. This prevents a positional deviation of the cushioning material sheet 30 in the direction of rotation with respect to the metal support 21 and the press plug 22.

With the above arrangement, even when wear is caused in the teeth of the pinion 3a or the rack 4, the resin sheet pad 21a, or the cushioning material sheet 30, the cushioning material sheet 30 biased by the biasing means 32 automatically moves in the direction perpendicular to the rack support direction. As a result, the metal support 21 for supporting the rack 4 moves toward the rack 4 to absorb a play produced by the wear. Therefore, a backlash in the meshed portion between the rack 4 and the pinion 3a can constantly be kept zero to achieve an automatic adjusting function, thereby reliably preventing rattle noise.

In addition, a play produced by a manufacturing error or the like in the direction of sliding of the rack 4 or the direction of rotation of the pinion 3a can also be absorbed by the set position of the cushioning material sheet 30 between the metal support 21 for supporting the rack 4 and the press plug 22 or the biasing force of the biasing means 32. As a result, a torque variation in a steering force transmission system on the steering gear side can be prevented.

Figure 4:
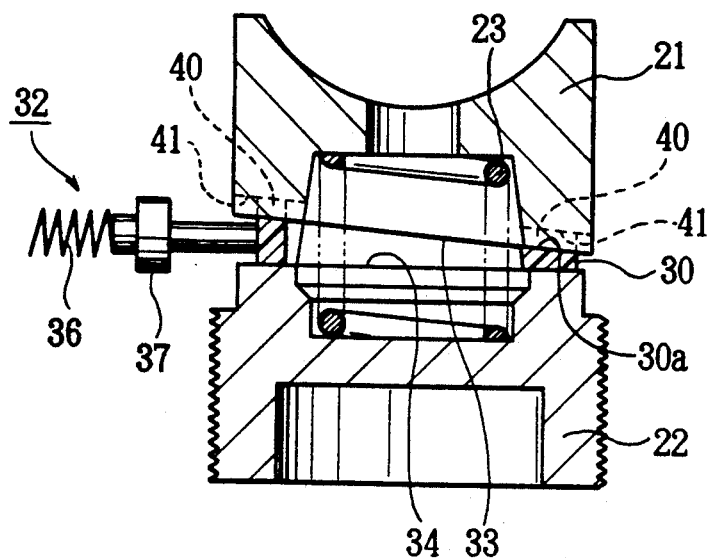
FIG. 4 is an enlarged sectional view showing a main part of another embodiment of the present invention.
Figure 5:
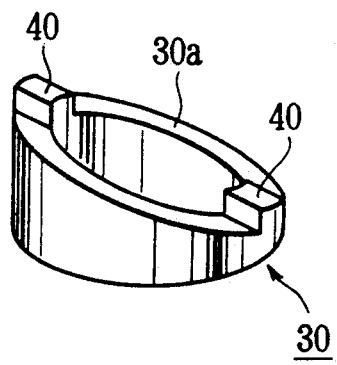
FIG. 5 is a schematic perspective view showing a cushioning material sheet used in the embodiment of FIG. 4.

FIGS. 4 and 5 show another embodiment of the present invention. This embodiment exemplifies a structure in which a combination of projecting portions 40 projecting from a tapered surface 30a of a cushioning material sheet 30 and a key way 41 formed in a tapered sliding surface 33 of a metal support 21 is used as a rotation-stopping means of the cushioning material sheet 30. The use of this arrangement also makes it possible to obtain the same effect as in the above embodiment.

Note that the present invention is not limited to the structures of the above embodiments, but the shapes, the structures, and the like of the individual parts can be arbitrarily modified or changed. For example, in each of the above embodiments, a combination of the metal support 21 and the resin sheet pad 21a is used as the rack support. However, it is possible to obtain the same effect as in the above embodiments by using a rack support constituted by only a metal support member or a resin support member.

In addition, in each of the above embodiments, the cushioning material sheet 30 consists of a synthetic resin material. The present invention, however, is not limited to the above embodiments, but the cushioning material sheet 30 can be made of a metal.

Furthermore, in each of the above embodiments, a combination of the urging member 37 and the coil spring 36 is used as the biasing means 32. However, any of various conventionally known biasing means can be used as long as it provides a biasing force capable of applying a moving power in the lateral direction to the cushioning material sheet 30.

Moreover, in each of the above embodiments, the present invention is applied to the rack support portion in the rack-and-pinion electric power steering apparatus 1. However, the present invention is not limited to the above embodiments but can be applied to any power steering apparatus, such as a hydraulic power steering apparatus, or a manual steering apparatus, provided that the apparatus is of a rack-and-pinion type.

As has been described above, according to the rack-and-pinion steering apparatus of the present invention, a cushioning material sheet, which is interposed between a rack support for supporting a rack to be meshed with a pinion and a press plug for closing a rack support parts assembly hole while applying an elastic force to a spring means for biasing the rack support toward the rack, is formed such that at least one of its end faces is tapered. There is also provided a biasing means for biasing this cushioning material sheet to move in a direction along which the thickness of the cushioning material sheet is decreased. As a result, the apparatus can achieve various superior effects enumerated below regardless of its simple and inexpensive arrangement.

(1) According to the present invention, even when wear is caused in the teeth of the pinion or the rack or in the resin sheet pad, the cushioning material sheet biased by the biasing means automatically moves in the direction perpendicular to the rack support direction to move the rack support toward the rack, thereby absorbing a play produced by the wear. As a result, an automatic adjusting function can be achieved so that a backlash in the meshed portion between the rack and the pinion is constantly kept zero, thereby reliably preventing rattle noise.

(2) According to the present invention, a play produced by a manufacturing error or the like in the direction of sliding of the rack or the direction of rotation of the pinion can also be absorbed by the set position of the cushioning material sheet between the rack support for supporting the rack and the press plug. As a result, it is possible to prevent a torque variation in a steering force transmission system on the steering gear side.

What is claimed is:

1. A rack-and-pinion steering apparatus comprising:
    a body accommodating a rack to be meshed with a pinion;
    a rack support slidably accommodated in a hole formed in said body;
    a spring means for biasing said rack support toward said rack;
    a press plug assembled to close an outer end portion of said hole while applying an elastic force to said spring means;
    a cushioning material sheet interposed between said rack support and said press plug, said cushioning material sheet having a tapered shape when viewed sideways; and
    biasing means for biasing said cushioning material sheet to move in a direction along which a thickness of said cushioning material sheet is decreasing;
    wherein said biasing means comprises an urging member engaged in a side portion of said cushioning material sheet in a rotation-stopped condition and is set to have a biasing force smaller than the biasing force of said spring means.

2. An apparatus according to claim 1, further comprising a resin sheet pad arranged between said rack support and said rack.

3. An apparatus according to claim 1, wherein at least one end face of said cushioning material sheet is formed to have a flat surface along a direction perpendicular to a rack support direction, and a slide-contact surface of a member to be brought into slide contact with said end face is also formed to have a flat surface.

4. An apparatus according to claim 1, wherein said cushioning material sheet has, on an end face having a tapered surface, means having a rotation-stop function to be engaged with an opposite member in a direction of rotation and a guide function in a direction of movement along said tapered surface.

* * * * *